United States Patent
Meyer et al.

(10) Patent No.: US 10,759,420 B2
(45) Date of Patent: Sep. 1, 2020

(54) METHOD FOR DETERMINING AN ACTIVATION CRITERION FOR A BRAKE APPLICATION AND EMERGENCY BRAKE SYSTEM FOR PERFORMING THE METHOD

(71) Applicant: WABCO GmbH, Hannover (DE)

(72) Inventors: Ruediger Meyer, Hannover (DE); Dirk Sandkuehler, Aachen (DE); Christian Sulzbacher, Hannover (DE)

(73) Assignee: WABCO GMBH, Hannover (DE)

( * ) Notice: Subject to any disclaimer, the term of this patent is extended or adjusted under 35 U.S.C. 154(b) by 133 days.

(21) Appl. No.: 16/027,385

(22) Filed: Jul. 5, 2018

(65) Prior Publication Data
US 2018/0354511 A1 Dec. 13, 2018

Related U.S. Application Data

(63) Continuation of application No. 14/762,524, filed as application No. PCT/EP2013/003616 on Nov. 30, 2013, now Pat. No. 10,046,761.

(30) Foreign Application Priority Data

Jan. 25, 2013 (DE) .......................... 10 2013 001229

(51) Int. Cl.
*B60W 30/09* (2012.01)
*B60W 30/095* (2012.01)
(Continued)

(52) U.S. Cl.
CPC .............. *B60W 30/09* (2013.01); *B60T 7/22* (2013.01); *B60T 8/17558* (2013.01);
(Continued)

(58) Field of Classification Search
None
See application file for complete search history.

(56) References Cited

U.S. PATENT DOCUMENTS

| 5,233,526 A | 8/1993 | Detriche et al. |
| 5,461,357 A | 10/1995 | Yoshioka et al. |

(Continued)

FOREIGN PATENT DOCUMENTS

| DE | 4302527 A1 | 8/1993 |
| DE | 69027917 T2 | 2/1997 |

(Continued)

OTHER PUBLICATIONS

Yoshiaki Kuwata et al., "Real-time Motion Planning with Applications to Autonomous Urban Driving", Sep. 2009, IEEE Transactions on Control Systems Technology, vol. 17, No. 5.

*Primary Examiner* — Jonathan M Dager
*Assistant Examiner* — Garrett F Evans
(74) *Attorney, Agent, or Firm* — Leydig, Voit & Mayer, Ltd.

(57) ABSTRACT

A method for automatically activating a brake application in a vehicle includes using at least one detection device, detecting at least one object in the environment of the vehicle and, using at least one processor, determining that a vehicle is on a collision course with the at least one object, determining an S-shaped avoidance trajectory of the vehicle and at least one avoidance criterion based at least in part on the S-shaped avoidance trajectory, determining two extreme values of a transverse acceleration of the vehicle from the S-shaped avoidance trajectory, determining whether the at least one avoidance criteria is fulfilled by comparing the two extreme values with a threshold value, wherein the avoidance criteria is fulfilled when the two extreme values fall below the threshold value, and activating an automatic brake application in the vehicle when an activation criterion for the automatic brake application is fulfilled.

19 Claims, 3 Drawing Sheets

(51) Int. Cl.
*B60W 10/20* (2006.01)
*B60W 10/184* (2012.01)
*B60T 8/1755* (2006.01)
*B60T 7/22* (2006.01)

(52) U.S. Cl.
CPC .......... *B60W 10/184* (2013.01); *B60W 10/20* (2013.01); *B60W 30/095* (2013.01); *B60T 2201/022* (2013.01); *B60T 2201/16* (2013.01); *B60T 2210/24* (2013.01); *B60W 2554/801* (2020.02); *B60W 2720/125* (2013.01)

(56) References Cited

U.S. PATENT DOCUMENTS

| | | | |
|---|---|---|---|
| 6,624,747 B1 | 9/2003 | Friederich et al. | |
| 7,283,902 B2 | 10/2007 | Heider et al. | |
| 8,170,739 B2 | 5/2012 | Lee | |
| 9,318,023 B2 * | 4/2016 | Moshchuk | B60W 10/20 |
| 2002/0059026 A1 | 5/2002 | Abe et al. | |
| 2003/0116373 A1 | 6/2003 | Miller et al. | |
| 2003/0220738 A1 | 11/2003 | Abe et al. | |
| 2004/0030498 A1 | 2/2004 | Knoop et al. | |
| 2004/0030499 A1 | 2/2004 | Knoop et al. | |
| 2004/0090117 A1 | 5/2004 | Dudeck et al. | |
| 2004/0090320 A1 | 5/2004 | Suzuki et al. | |
| 2004/0193374 A1 | 9/2004 | Breuer et al. | |
| 2005/0060071 A1 | 3/2005 | Winner | |
| 2005/0278112 A1 | 12/2005 | Gern et al. | |
| 2008/0162010 A1 | 7/2008 | Klotz et al. | |
| 2008/0208408 A1 * | 8/2008 | Arbitmann | B62D 15/0265 701/41 |
| 2008/0243378 A1 | 10/2008 | Zavoli | |
| 2009/0070029 A1 | 3/2009 | Beuschel et al. | |
| 2009/0192683 A1 | 7/2009 | Kondou et al. | |
| 2010/0228427 A1 * | 9/2010 | Anderson | G08G 1/166 701/31.4 |
| 2010/0235035 A1 * | 9/2010 | Nishira et al. | G08G 1/65 71/31.4 |
| 2011/0246156 A1 | 10/2011 | Zecha et al. | |
| 2011/0288774 A1 * | 11/2011 | Bengtsson | G08G 1/16 701/301 |
| 2012/0065861 A1 | 3/2012 | Hartmann et al. | |
| 2012/0283927 A1 | 11/2012 | Reinisch et al. | |
| 2013/0211687 A1 | 8/2013 | Trost et al. | |
| 2015/0353062 A1 | 12/2015 | Breuer et al. | |

FOREIGN PATENT DOCUMENTS

| | | |
|---|---|---|
| DE | 10352596 A1 | 5/2004 |
| DE | 10336986 A1 | 3/2005 |
| DE | 102005002760 A1 | 8/2005 |
| DE | 102004028404 A1 | 1/2006 |
| DE | 102004056027 A1 | 5/2006 |
| DE | 102004056120 A1 | 5/2006 |
| DE | 102005002504 A1 | 7/2006 |
| DE | 102006034254 A1 | 4/2007 |
| DE | 10012737 B4 | 9/2007 |
| DE | 10154321 B4 | 2/2009 |
| DE | 102008062916 A1 | 6/2010 |
| DE | 102009012226 A1 | 9/2010 |
| DE | 102009020649 A1 | 11/2010 |
| DE | 102010028384 A1 | 11/2010 |
| DE | 102010006214 A1 | 8/2011 |
| DE | 102010018038 A1 | 10/2011 |
| DE | 102010023164 A1 | 12/2011 |
| DE | 102010049351 A1 | 4/2012 |
| EP | 0778507 A2 | 6/1997 |
| EP | 1057159 B1 | 12/2000 |
| EP | 1223093 B1 | 7/2002 |
| EP | 1263634 B1 | 3/2004 |
| EP | 1303421 B1 | 3/2004 |
| EP | 1409311 B1 | 3/2004 |
| EP | 1409310 B1 | 4/2009 |
| EP | 2060455 A1 | 5/2009 |
| EP | 1926654 B1 | 12/2009 |
| EP | 1926646 B1 | 3/2010 |
| EP | 1926647 B1 | 4/2011 |
| JP | H 07179140 A | 7/1995 |
| JP | 2003341501 A | 12/2003 |
| JP | 2004517004 A | 6/2004 |
| JP | 2007008300 A | 1/2007 |
| JP | 2007253745 A | 10/2007 |
| JP | 2009137562 A | 6/2009 |
| JP | 2009184497 A | 8/2009 |
| JP | 2009286279 A | 12/2009 |
| JP | 2010519550 A | 6/2010 |
| JP | 2012052956 A | 3/2012 |
| WO | WO 9942973 A1 | 8/1999 |
| WO | WO 03006291 A1 | 1/2003 |
| WO | WO 2006042512 A1 | 4/2006 |
| WO | WO 2008031662 A1 | 3/2008 |
| WO | WO 2012119596 A1 | 9/2012 |
| WO | WO 2014114310 A1 | 7/2014 |

* cited by examiner

METHOD FOR DETERMINING AN ACTIVATION CRITERION FOR A BRAKE APPLICATION AND EMERGENCY BRAKE SYSTEM FOR PERFORMING THE METHOD

CROSS REFERENCE TO RELATED APPLICATIONS

This application claims benefit to U.S. patent application Ser. No. 14/762,524, filed on Jul. 22, 2015, which is a U.S. National Phase application under 35 U.S.C. § 371 of International Patent Application No. PCT/EP2013/003616 (WO 2014/114311), filed on Nov. 30, 2013, that claims benefit to German Patent Application No. DE 10 2013 001 229.5, filed Jan. 25, 2013.

FIELD

The present invention generally relates to emergency brake systems.

BACKGROUND

Emergency brake systems of the general type under consideration are used in commercial vehicles to effect a brake application upon detection of an imminent collision with an object. The term "collision" means an impact of the vehicle with the object, which can be moving, such as another vehicle that is traveling ahead of the vehicle, or stationary, such as a road sign or a non-moving vehicle.

In order to assess whether the vehicle is on a collision course with an object, once the object is determined to be in the environment of the vehicle, the future driving behavior of the vehicle with regard to the object is determined, In so doing, consideration is given to the dynamic parameters of the vehicle and also of the object, including whether the vehicle can still avoid the object or whether an impact can be prevented by means of a brake application, in other words whether the driver can theoretically still prevent the collision. If the driver is no longer able to prevent a collision, an emergency brake application is performed automatically.

A brake system of this general type is described in DE 10 2010 006 214 A1. Once an object is detected in the environment of the vehicle, the last possible moment to intervene for a brake application is determined by taking into consideration the prevailing dynamics of the vehicle and the object and also the reaction time of the driver. Based thereon, a brake application is initiated in order to prevent a collision and to reduce the consequences of a collision. Furthermore, the last possible moment for avoiding a collision is taken into consideration by assuming that the avoidance trajectory of the vehicle corresponds to a parabola or a circle.

EP 1 057 159 B1 describes a method for preventing a collision, wherein a calculation is performed to determine a minimum distance that is required with respect to a vehicle ahead in order at a maximal possible vehicle deceleration to avoid a collision with the vehicle ahead. The relative velocity and the relative acceleration between the two vehicles are taken into consideration. Furthermore, a minimal distance is also taken into consideration that is required for a possible avoidance maneuver (steering the vehicle past the vehicle ahead).

With reference to these two distances, an emergency brake application is initiated in the event of a possible collision.

SUMMARY OF THE INVENTION

A method for automatically activating a brake application in a vehicle includes using at least one detection device, detecting at least one object in the environment of the vehicle and, using at least one processor, determining that a vehicle is on a collision course with the at least one object, determining an S-shaped avoidance trajectory of the vehicle and at least one avoidance criterion based at least in part on the S-shaped avoidance trajectory, determining two extreme values of a transverse acceleration of the vehicle from the S-shaped avoidance trajectory, determining whether the at least one avoidance criteria is fulfilled by comparing the two extreme values with a threshold value, wherein the avoidance criteria is fulfilled when the two extreme values fall below the threshold value, and activating an automatic brake application in the vehicle when an activation criterion for the automatic brake application is fulfilled.

BRIEF DESCRIPTION OF THE DRAWINGS

The present invention is discussed in greater detail below on the basis of exemplary embodiments illustrated in the accompanying drawings, in which.

DETAILED DESCRIPTION

Figure 1:
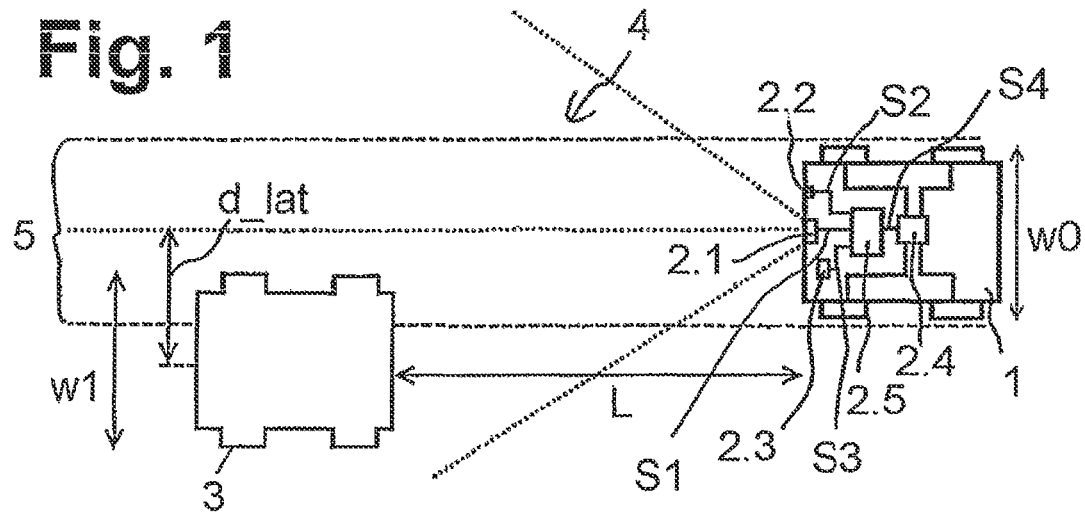
FIG. 1 illustrates a vehicle on a collision course with at least one object, the vehicle equipped with an emergency brake system according to an embodiment of the present invention.

Embodiments of the present invention provide methods for determining an activation criterion for a brake application, and an emergency brake system for performing the method, which enhance vehicle safety.

In accordance with various embodiments of the present invention, the environment of the vehicle is initially observed, and, upon detection of an object in the environment, a determination is made as to whether the vehicle is on a collision course with the object. In order to observe the environment, it is possible to use, for example on-board distance sensors or a camera system and it is possible to detect from their signals, as is generally known, a distance and also dynamic properties of the object, for example the velocity and the acceleration. It is thus possible by way of example to determine whether the object is a moving or stationary road user or a stationary object, for example a road sign.

In order to check whether the vehicle is on a collision course, the relative velocities and the relative movements with respect to one another are taken into consideration in order to estimate whether a collision is at all imminent. For this purpose, it is possible, for example, to extrapolate the prevailing trajectories of the vehicle and of the object in order to detect whether the two trajectories intersect. In order to determine the dynamic behavior of the vehicle, it is possible to use an on-board sensor system, for example a GPS system, acceleration sensors or velocities sensors. It is likewise feasible to use rain sensors in order for example to be able to take into consideration in addition the grip of the tires on the road surface.

If it is detected that the vehicle is on a collision course with the object, an avoidance criterion is determined. The avoidance criterion indicates whether it is still theoretically possible for the vehicle driver to steer the vehicle past an object by means of a steering maneuver. For this purpose, an avoidance trajectory for the vehicle is determined based upon the vehicle behavior at the respective point in time, and an assessment is made as to whether the vehicle that will be travelling on this avoidance trajectory in the future will make contact with the object or not, that is, whether avoidance is theoretically possible or not. The term "trajectory" in this case refers to a spatial trajectory, that is, a mathematical description of a possible future travel path of the vehicle.

The avoidance trajectory can be assumed to be an S-shaped trajectory that describes the avoidance behavior of the vehicle as precisely as possible. Particular consideration is given to the fact that the vehicle after the avoidance maneuver returns essentially to the same alignment it was in prior to the avoidance maneuver, wherein the alignment relates to the vehicle path in which the vehicle was moving prior to the avoidance maneuver. The vehicle path of the vehicle is described as the path along which the vehicle is travelling, wherein not only the preceding travel path can be taken into consideration but it also possible to extrapolate a future travel path by means of a prediction process with reference to the prevailing vehicle data.

When moving along a straight road, the vehicle path is essentially along an axis, so that an avoidance trajectory is determined in which the vehicle is aligned essentially parallel to the vehicle path after the avoidance maneuver. When performing an avoidance maneuver in a curve with a constant curve radius, the vehicle path follows the curve profile and an avoidance trajectory is determined in which the vehicle after the avoidance maneuver is aligned essentially in a tangential manner with respect to the vehicle path prior to the avoidance maneuver, so that the vehicle after the avoidance maneuver merely continues to follow the curve profile in a different traffic lane.

S-shaped trajectory preferably means a trajectory that comprises at least one turning point that corresponds mathematically to a change of algebraic sign in the curvature of the trajectory. If by way of example, an avoidance maneuver on a straight section is considered, in which the vehicle driver turns the steering wheel first to the right and subsequently back to the left (moving over to the right-hand traffic lane), then the avoidance trajectory comprises a turning point during the change of the steering movement from the right to the left.

In order to simplify the calculation of the avoidance trajectory when negotiating a curve, the avoidance trajectory can also be determined in polar coordinates. This has the advantage that the avoidance trajectory can be determined in a simpler manner based upon the curve angle that has been negotiated. As is generally known, a polar coordinate system is determined by means of a curve angle and a curve radius in order, for example, to be able to describe trigonometric functions in a simpler manner.

An S-shaped avoidance trajectory of this type can be described preferably by means of a function that comprises as an additional term, by way of example a trigonometric function, such as by means of a sliding sine $(T(k) \sim k - \sin(k))$, It is possible to introduce additional scale parameters, for example the distance between the vehicle and the object, a width of the vehicle and the object and a lateral displacement between the middle axis of the object and the vehicle, so that the avoidance trajectory can be defined unambiguously based upon the scale parameter.

It is possible, when determining the scale parameters, to take into consideration that the detected object still moves in the region of the avoidance trajectory during the avoidance maneuver, for example by accelerating or steering to the side, as a consequence of which the distance and the lateral displacement between the object and the vehicle change. For this purpose, it is also possible, when determining the avoidance trajectory, to take into consideration the transverse velocity and the acceleration of the object at the point in time at which the avoidance trajectory is determined. Advantageously, this also makes it possible to take into consideration in the avoidance trajectory a predicted travel path of the object In accordance with an embodiment of the present invention, a maximum transverse acceleration that acts on the vehicle if the vehicle is moving along the avoidance trajectory is additionally taken into consideration When determining the avoidance criterion, For this purpose, the curvature or the curvature function of the avoidance trajectory is preferably considered, wherein at the site or the sites at which the curvature is at its maximum, the transverse acceleration that is acting upon the vehicle is also at its maximum It is used to determine the extreme values of the curvature function that can arise from the first derivative of the curvature function and to calculate the transverse acceleration of the vehicle at these sites and to compare the transverse acceleration with at least one threshold value. For example, the threshold value can be selected to represent the maximum transverse acceleration at which the vehicle loses grip on one side with the road surface.

In accordance with an embodiment of the present invention, the avoidance trajectory is only fulfilled if an avoidance trajectory can be found and the maximum transverse acceleration on this avoidance trajectory is below the threshold value, that is, the driver can theoretically still perform an avoidance maneuver without the vehicle tilting to the side. This has the advantage that an avoidance trajectory is not taken into consideration for an avoidance maneuver on which excessively high transverse accelerations act upon the vehicle.

Preferably, further avoidance criteria can be taken into consideration, fix example whether the vehicle is maneuvered into an oncoming traffic lane or whether there are other vehicles in the proximity of the vehicle and thus it is also therefore not possible to perform an avoidance maneuver.

Based upon the avoidance criterion, an activation criterion is determined, wherein upon fulfilling the activation criterion an automatic brake application is initiated in the vehicle. The activation criterion is not fulfilled as long as the avoidance criterion is still fulfilled, so that a brake application is only initiated if it is no longer possible with the theoretical assumptions to perform an avoidance maneuver.

Preferably, the activation criterion is still dependent upon a braking criterion that is fulfilled as long as the driver can still perform a brake application or the longitudinal acceleration of the vehicle is above a specific value.

Advantageously, an automatic brake application is really only initiated if there is no other possibility for the driver to avoid the collision. A simple check is performed as to whether it is theoretically still possible to perform an avoidance maneuver while maintaining parameters, wherein a function that can be managed in a mathematically simple manner and can be calculated in a simple manner, even when negotiating curves, and from which it is possible to determine the maximum transverse accelerations, even when negotiating curves, is used as an avoidance trajectory.

Still other objects and advantages of the present invention will in part be obvious and will in part be apparent from the specification.

The present invention accordingly comprises the features of construction, combination of elements, arrangement of parts, and the various steps and the relation of one or more of such steps with respect to each of the others, all as exemplified in the constructions herein set forth, and the scope of the invention will be indicated in the claims.

The vehicle 1, preferably a commercial vehicle, such as a lorry, comprises in accordance with FIG. 1 a camera system 2.1, a proximity sensor 2.2, a sensor system 2.3, a brake system 2.4 and an ECU 2.5. The ECU 2.5 receives signals S1-S3 from the elements 2.1, 2.2, 2.3, processes the signals and transmits signals S4 to the brake system 2.4.

The sensor system 2.3 determines the driving dynamic characteristics of the vehicle 1 and can comprise, for example, a GPS system, velocity sensors, acceleration sensors or rain sensors. The camera system 2.1 and the proximity sensor 2.2 are capable of observing an environment 4 of the vehicle 1 and detecting individual objects 3. The dynamic characteristics, by way of example the velocity or the acceleration, of the detected object 3 are determined either directly from the camera system 2.1 or from the proximity sensor 2.2, or the signals S1, S2 that have been received are transmitted to the ECU 2.5 or to a further processing unit in the vehicle 1 for further processing.

Consequently, it is possible to detect initially whether an object 3 is located in the environment 4 of the vehicle 1 and at which relative velocity r_v and relative acceleration r_a the object 3 is moving with respect to the vehicle 1. Moreover, it is possible to determine a distance L and also a lateral displacement d_lat with respect to the detected object 3, wherein the distance L represents the distance from the vehicle 1 to the object 3 in the travel direction A and the lateral displacement d_lat represents the distance from a middle axis of the vehicle 1 to the middle axis of the detected object 3 perpendicularly with respect to the travel distance A, as illustrated in FIG. 1.

The detection process is not limited to an object 3. On the contrary, several objects 3 can be detected and, under certain conditions, combined to form an object area OR. By way of example, two road users travelling adjacent to one another whose distance within a tolerance range is less than a width w0 of the vehicle 1 can be combined to form one object area OR and are thus treated as one object 3.

If an object 3 is detected in the environment 4 of the vehicle 1, then a determination is initially made as to whether the vehicle 1 is on a collision course with the detected object 3. For this purpose, it is possible, by way of example, to extrapolate the prevailing travel paths of the object 3 and of the vehicle 1 based upon the determined dynamic characteristics in order to detect whether the object 3 crosses the vehicle 1, by way of example within a previously defined period of time dt.

The detected object 3 can also be stationary. It can be a road sign, a stationary road user or also a traffic lane demarcation.

If it is established that the vehicle 1 is on a collision course with a detected object 3, then at least one avoidance criterion K_avoid is determined that indicates whether it is still theoretically possible for the driver of the vehicle 1 to drive around the detected object 3.

For this purpose, an avoidance trajectory T(k) is determined using a trajectory parameter k that preferably, based upon the distance L and the lateral displacement d_lat with respect to the detected object 3, describes a plausible avoidance path that the driver of the vehicle 1 drives along if an avoidance maneuver is performed at this point in time. In accordance with an embodiment of the present invention, the avoidance trajectory T(k) is assumed to be an S-shaped trajectory that describes an avoidance maneuver during which the vehicle 1 is aligned essentially the same prior to and after the avoidance maneuver, wherein the alignment relates to the vehicle path 5 of the vehicle 1 prior to the avoidance maneuver.

The travel path of the vehicle 1 is referred to as the vehicle path 5, taking into consideration the deviation of the vehicle 1, wherein not only the preceding travel path can be considered but rather a future travel path can also be extrapolated by virtue of a prediction process with reference to current vehicle data.

Figure 4:
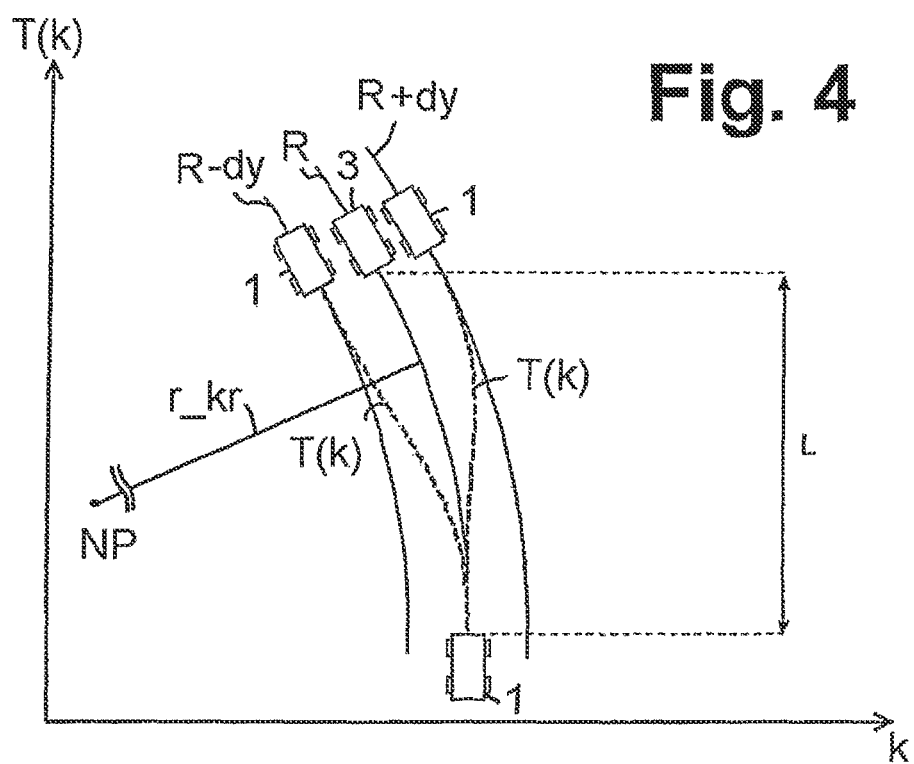
FIG. 4 illustrates a vehicle on a collision course with an object while negotiating a curve.

As illustrated in FIG. 1, the vehicle path 5 extends on a straight road essentially along an axis that lies parallel to the travel direction A so that an avoidance trajectory T(k) is determined wherein the vehicle 1 is aligned essentially parallel to the vehicle path 5 after the avoidance maneuver. In the case of an avoidance maneuver in a curve that has a constant curve radius R, the vehicle path 5 follows the curve profile (FIG. 4) and an avoidance trajectory T(k) is determined wherein the vehicle 1 is aligned essentially tangentially with respect to the vehicle path 5 after the avoidance maneuver, so that the vehicle 1 continues to follow the curve profile after the avoidance maneuver merely into another traffic lane, as illustrated in FIG. 4.

When determining the avoidance trajectory T(k), it is also possible to take into consideration movement of the object 3 in relation to the vehicle 1. As a consequence, the distance L that is taken into consideration as a parameter in the avoidance trajectory T(k) is not constant under certain conditions. Likewise, the lateral offset d_lat between the vehicle 1 and the object 3 is not constant. The two parameters can be taken into consideration when determining the avoidance trajectory. It is possible for this purpose, in particular with reference to the detected dynamic characteristics of the object 3, to prejudge how the object 3 is moving during the avoidance maneuver and to adjust the avoidance trajectory T(k) accordingly.

A sliding sine (see FIG. 2) can be used as an S-shaped avoidance trajectory T(k), wherein the sliding sine is produced by the function:

$$T(k) = a*k + b*\sin(c*k).$$

wherein k represents the trajectory parameter, T(k) represents the avoidance trajectory based upon the trajectory parameters k, and a, b and c represent scale parameters that are based upon the distance L between the vehicle 1 and the object 3 and also upon the lateral displacement d_lat and the width w0 of the vehicle 1 and also upon the width w1 of the object 3.

Consequently, the avoidance trajectory T(k) comprises, as an additional term, a trigonometric function. In addition, the avoidance trajectory T(k) comprises a turning point WP that corresponds to a curvature change of the avoidance trajectory T(k) or to a change in the steering movement. In other words, during an avoidance maneuver, the vehicle driver turns the steering wheel relative to the initial steering movement first in one direction and then at the turning point WP turns the steering wheel in the other direction in order to return the vehicle 1 to its original alignment relative to the vehicle path 5. Since the sine is periodic in the function and only one avoidance maneuver is considered, only the first period of the sliding sine is considered, that is, values for k in an interval of 0 to 2*Pi or 0 to 360°.

Figure 2:
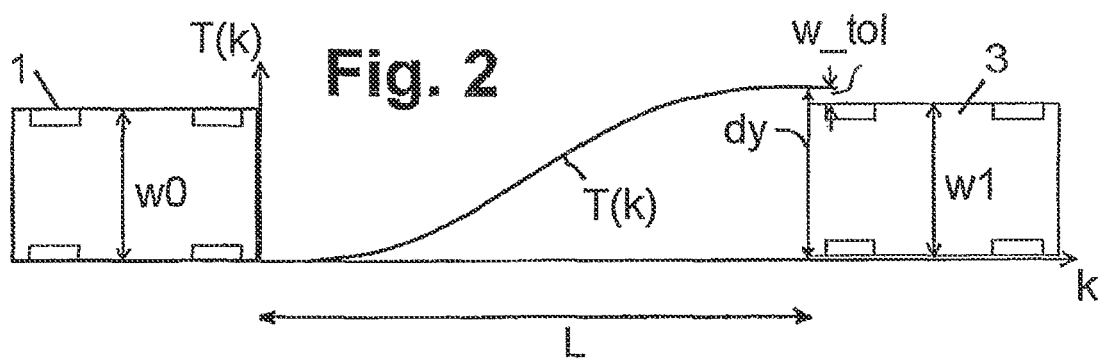
FIG. 2 illustrates an avoidance trajectory of a vehicle and a detected object.

Furthermore, the avoidance trajectory T(k) can be considered in different coordinate systems:

When driving in a straight line (FIG. 1), the avoidance trajectory T(k) is preferably described in Cartesian coordinates, wherein the trajectory parameter k of the x-coordinate and the function value T(k=x) corresponds to the y-coordinate and, in accordance with FIG. 2, the x-coordinate extends parallel to the travel direction A and the y-coordinate extends perpendicularly with respect to the direction A.

When negotiating a curve in which the avoidance trajectory T(k) changes from one curve radius R to another curve radius R+/−dy (see FIG. 4), wherein the curve radii R, R+/−dy each have the same zero point NP as a reference point (vehicle path change in a curve), the avoidance trajectory T(k) is preferably set in polar coordinates, wherein the trajectory parameter k corresponds to a circle angle phi and the function value T(Phi) corresponds to a circle radius r_kr that is produced by the distance of the vehicle 1 to the zero point NP of the curve. As a consequence, an avoidance maneuver in a curve that has an almost constant curve radius R can be described in simpler manner, The transition from Cartesian coordinates to polar coordinates is performed essentially by substituting x by Phi*R, so that the sliding sine T(Phi) in polar coordinates is essentially described by:

$$T(\text{Phi})=r\_kr(\text{Phi})=a*\text{Phi}*R-b*\sin(c*\text{Phi}*R)+R.$$

In order to scale the sliding sine to the respective driving situation of the vehicle 1 that is on the collision course, the scale parameters are selected such that the avoidance trajectory T(k) at k=L assumes the value (d_lat+w0/2+w1/2+w_tol)=dy (width of the avoidance maneuver), wherein w0 and w1 represent the widths of the vehicle 1 or the object 3 respectively and w_tol represents a tolerance width, Consequently, an avoidance trajectory T(k) is produced in which the vehicle 1 is located after it has covered the distance L with a tolerance width w_tol adjacent to the object 3.

Taking into consideration that only one period of the sliding sine is considered and the distance L is to be achieved after one period, the avoidance trajectory is produced as:

$$T(x)=dy*x/L-dy/2\text{Pi}*\sin(2\text{Pi}*x/L) \quad \{\text{Equation 1}\}$$

in Cartesian coordinates, and:

$$T(\text{Phi})=dy*R*\text{Phi}/L-dy/2\text{Pi}*\sin(2\text{Pi}*R*\text{Phi}/L)+R \quad (\text{Equation 2})$$

(with phi∈L/R; T(0)=R; T(L/R)=R+/−dy) in polar coordinates. Hereinafter, the avoidance trajectory T(k) is considered independently from the coordinate system, in other words with the general trajectory parameter k.

If the avoidance trajectory T(k) is determined, it is still necessary to check whether it is possible for the vehicle 1 to perform an avoidance maneuver and change to this avoidance trajectory T(k). In particular, a maximum transverse acceleration a_max of the vehicle 1 is determined, so that a check can be performed as to whether the vehicle 1 would by way of example tip over when driving on the avoidance trajectory T(k).

For this purpose, a curvature Kappa(k) of the avoidance trajectory T(k) is initially determined and is produced from the reciprocal value of the radius R(k) at the site k of the avoidance trajectory T(k):

$$\text{Kappa}(k)=1/R(k) \quad (\text{Equation 3})$$

The radius R(k) of the avoidance trajectory T(k) is produced in turn from the first and the second derivative of the avoidance trajectory T(k) with respect to the trajectory parameter k:

$$R=(1+(dT(k)/dk)^2)^{3/2}]/(d^2T(k)/dk^2) \quad (\text{Equation 4})$$

Under the assumption that the velocity of the vehicle 1 does not change during the avoidance maneuver, the maximum transverse accelerations a_quer also act on the vehicle 1 at the sites of the maximum curvature Kappa(k) of the avoidance trajectory T(k). However, even if the velocity of the vehicle 1 changes, that is, in the case of a positive or negative acceleration on the avoidance trajectory T(k), the: positions of the maximum transverse acceleration a_max are displaced only to a minimal extent in relation to the positions of the maximum curvature. Therefore, the maximum transverse acceleration a_max can be determined in a good approximation from the extreme sites Kappa_max_1, Kappa_max_2 of the curvature Kappa (k). Two extreme sites Kappa_max_1, Kappa_max_2 are produced in the case of an S-shaped avoidance trajectory T(k).

The extreme values Kappa_max_1, Kappa_max_2 can be determined using Equation 3, with the aid of Equations 1 and 4, and the derivative Kappa'(k)=dy/dKappa*Kappa(k) is formed. The extreme values Kappa_max_1, Kappa_max_2 are produced from the zero sites of the derivative Kappa'(k)=0, wherein the x-values x_max_1, x_max_2 of the extreme sites Kappa_max_1, Kappa_max_2 are used for the subsequent calculation of the maximum transverse acceleration a_max.

The transverse acceleration a_quer(k) of the vehicle 1 at the site k is produced from the formula:

$$a\_\text{quer}(k)=v(k)^2*\text{Kappa}(k), \quad (\text{Equation 5})$$

wherein the velocity v(k) of the vehicle 1 after a travel path s has been covered on the avoidance trajectory T(k) under the assumption of a constant longitudinal acceleration a_long of the vehicle 1 In the travel direction A is produced by:

$$v(s)=\sqrt{((v\_0)^2+2*a\_\text{long}*s)}, \quad (\text{Equation 6})$$

wherein v_0 is the velocity prior to the avoidance maneuver, a_long is the longitudinal acceleration in the travel direction A and s is the distance covered from the start of the avoidance maneuver.

Consequently, two solutions for the maximum transverse acceleration are produced using Equations 5 and 6;

$$a\_\max=((v\_0)^2+2*a\_\text{long}*s))*\text{Kappa}\_\max\_1/2, \quad (\text{Equation 7})$$

wherein, of the two solutions for a_max, only the one with the higher value is relevant for the subsequent method steps.

Figure 3:
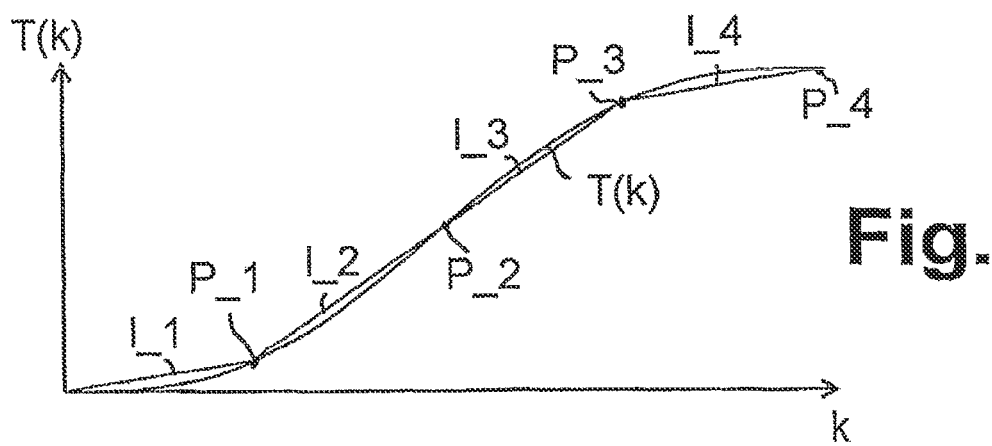
FIG. 3 illustrates a linear approximation of an avoidance trajectory.

In order to determine the covered distance s, the avoidance trajectory T(k) is approximated in accordance with FIG. 3 in a linear manner between the extreme sites Kappa_max_1, Kappa_max_2 and the turning point WP, so that, according to a simple geometric consideration, the distance s is produced from the connecting straight lines 1_i=1, . . . 4 over the x- and y-coordinates of the extreme points Kappa_max_1, Kappa_max_2 and the turning point WP. The points P_i=1 . . . 4 in accordance with FIG. 3 are produced by:

$$P\_1=(x\_\max\_1,T(x\_\max\_1))$$

$$P\_2=(L/2,dy/2)$$

$$P\_3=(x\_\max\_2,T(x\max\_2))$$

$$P\_4=(L,dy)$$

The distances s between the points P_i are produced from the coordinates of the points P_i, so that the maximum transverse acceleration a max can be determined with the aid of Equation 7, wherein the longitudinal acceleration a_long vehicle interior is measured by the sensor system 2.3. It is preferably taken into consideration whether the longitudinal acceleration a_long is constant at the point in time when it is considered or whether it changes, in other words, the vehicle maintains its velocity v or does not maintain its velocity.

If the vehicle 1 accelerates (a_long>0), then a greater transverse acceleration a_quer is to be expected at the second extreme site Kappa_max_2 than at the first extreme site Kappa_max_1 Consequently, the distance up to the point P_3 (s=1_1+1_2+1_3)) is relevant as the distance s in Equation 7. If the vehicle 1 does not accelerate during the avoidance maneuver (a_long=0), the transverse accelerations a_quer at the two points P_1 and P_3 are equal, the distance s can therefore be selected accordingly (s=1_1 or S=1_1+1_2+1_3)). If the vehicle 1 is braked (a_long<0), then only the maximum transverse acceleration a_max is decisive at the point P_1, that is, S=i_1 applies in Equation 7.

If a maximum transverse acceleration a_max is determined, then a check is performed as to whether this determined maximum transverse acceleration a_max exceeds a threshold value a_thresh. The threshold value a_thresh can be selected, for example, such that the vehicle 1 would tip over if the threshold value is exceeded. Consequently, it is possible, based upon the determined avoidance trajectory T(k), to check whether it is at all possible for the vehicle 1 to perform an avoidance maneuver safely on this avoidance trajectory T(k). It is also possible to use multiple threshold values a_thresh in order to take into consideration further safety parameters. In particular, tolerance limits can be provided so that in the case of a first threshold value a_thresh_1 being exceeded, the first threshold value being less than a second threshold value a_thresh_2, for example, a warning signal S6 is initially output to the driver to warn in good time that an avoidance maneuver is no longer possible in the near future, Only when the transverse acceleration a_quer also exceeds a second threshold value a_thresh_2 is a brake signal S5 transmitted to the brake system 2.4.

Consequently, the avoidance trajectory T(k) is used to check an avoidance criterion K_avoid that is fulfilled if it is still theoretically possible for the driver to initiate an avoidance maneuver. Only when the avoidance criterion is no longer fulfilled is an activation criterion K_act fulfilled. In the case of the activation criterion being fulfilled, signals S4 are transmitted, for example, by the ECU 2.5 to the brake system 2.4 in order to initiate a brake application. Prior to an automatic brake application being initiated, additional braking criteria K_brake can be checked in order to ensure that there are no longer any other options of avoiding the collision. In particular, it is possible to check whether the driver is still able to apply the brakes, whether the driver has already initiated a brake application or whether the longitudinal acceleration a_long exceeds a defined value.

In addition, a vehicle path criterion K_F that takes into consideration in part areas where the vehicle overlaps with the object 3 can be set.

Figure 5:
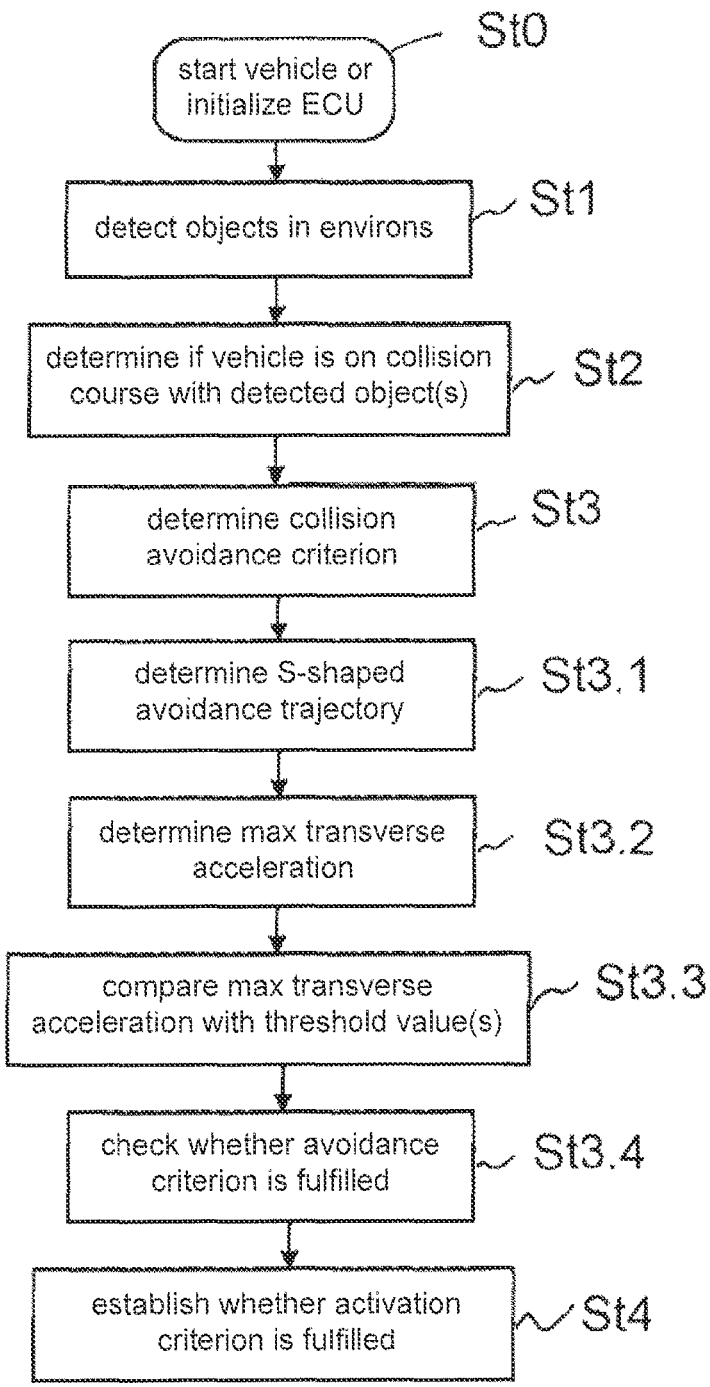
FIG. 5 is a flow chart illustrating process steps in a method for determining a brake application activation criterion in accordance with an embodiment of the present invention.

Referring now to FIG. 5, which is a flow chart of a method for determining a brake application activation criterion in accordance with an embodiment of the present invention, the vehicle 1 is started or the ECU 2.5 is initialized at step St0.

In step St1, an environment 4 of the vehicle 1 is initially observed, for example by means of the camera system 2.1 and supported by the proximity sensors 2.2. In the case of an object 3 being detected, the correspondingly received signals S1 and S2 are either processed in a processing unit of the camera system 2.1 or of the proximity sensors 2.2 or the signals S1, S2 are transmitted to the ECU 2.5.

In step St2, it is determined with the aid of the signals S1, S2 whether the vehicle 1 is on a collision course with the object 3. For this purpose, dynamic characteristics of the object 3 are determined from the signals SI, S2 and compared with the driving dynamic characteristics of the vehicle, the driving dynamic characteristics being determined by the sensor system 2.3.

If the vehicle 1 is on a collision course with the object 3, then an avoidance criterion K_avoid is determined in step St3 and the avoidance criterion indicates whether it is still possible for the driver of the vehicle 1 to perform an avoidance maneuver. For this purpose, an S-shaped avoidance trajectory T(k) is determined in step 3.1 with the aid of the distance L and the avoidance maneuver width dy that is produced from the lateral displacement d_lat and the widths w0, w1 of the vehicle 1 or the object 3 respectively, and the S-shaped avoidance trajectory is preferably described by means of a sliding sine (Equations 1, 2).

In step 3.2, a maximum transverse acceleration a_max is subsequently determined that acts on the vehicle 1 if the vehicle moves in the future on the avoidance trajectory T(k). Subsequently, this determined maximum transverse acceleration a_max is compared in step 3.3 with at least one threshold value a_thresh. A check is then performed in step 3.4 as to whether, based upon the threshold value a_thresh, the avoidance criterion K_avoid is fulfilled. Consequently, a plausibility check is performed as to whether the vehicle 1 can perform an avoidance maneuver safely on the determined avoidance trajectory T(k) and would not, for example, tip over as a result of an excessively high transverse acceleration a_quer acting on the vehicle 1.

If the avoidance criterion K_avoid is fulfilled, that is, if it is still possible for the driver to perform an avoidance maneuver, then it is established in step 4 that the activation criterion K_act for the brake application is not fulfilled. Consequently, as long as it is possible to perform 1 an avoidance maneuver, the ECU 2.5 does not transmit a signal S5 to the brake system 2.4. It is thus possible to ensure that a brake application is not initiated without cause and the driver is still able to intervene for as long as is theoretically possible.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at

LIST OF REFERENCE CHARACTERS 1 vehicle
2.1 Camera system
2.2 Proximity sensor
2.3 Sensor system
2.4 Brake system
2.5 ECU
3 Object
4 Environment
5 Vehicle path
A Travel direction
a_max maximum transverse acceleration
a_quer Transverse acceleration
a_long Longitudinal acceleration
a_thresh_1,2 Threshold values
a,b,c Scale parameters
d_lat lateral/perpendicular displacement of the middle point-axis Object—Vehicle
dt Period of time
k Trajectory parameter
K_avoid Avoidance criterion
K_act Activation criterion
K_F Vehicle path criterion
K_brake Brake criterion
Kappa Curvature of T(k)
Kappa_max_1, Extreme values of the curvature
Kappa_max_2
L Distance: Object—Vehicle in the travel distance A
1_i; i=1 . . . 4 Connecting straight lines
NP Zero point
OR Object area
P_i; i=1 . . . 4 Points on the connecting straight lines 1_i
Phi Circle angle
R Curve radius
r_kr Distance: Vehicle—Zero point
r_v Relative velocity: Object—Vehicle
r_a Relative acceleration: Object—Vehicle
S Travel Path covered
S1 Signal camera—ECU
S2 Signal proximity sensor—ECU
S3 Signal Sensory System—ECU
S4 Signal ECU—Brake System
T(k) Avoidance trajectory
v Velocity of the vehicle
v_0 Velocity prior to the avoidance maneuver
w0 Width of the vehicle
w1 Width of the object
WP Turning point
w_tol Tolerance width
x_max_1 x-value of the extreme value Kappa_max_1
x_max_2 x-value of the extreme value Kappa_max_2

What is claimed is:

1. A method for automatically activating a brake application in a vehicle having a brake system, the method comprising:
using at least one detection device, detecting at least one object in the environment of the vehicle; and
using at least one processor:
determining that a vehicle is on a collision course with the at least one object,
determining an S-shaped avoidance trajectory of the vehicle and at least one avoidance criterion based at least in part on the S-shaped avoidance trajectory,
determining two extreme values of a transverse acceleration of the vehicle from the S-shaped avoidance trajectory,
determining whether the at least one avoidance criteria is fulfilled by comparing the two extreme values with a threshold value, wherein the avoidance criteria is fulfilled when the two extreme values fall below the threshold value, and
activating an automatic brake application in the vehicle when an activation criterion for the automatic brake application is fulfilled, wherein the activation criterion for the automatic brake application is not fulfilled as long as the at least one avoidance criterion is fulfilled,
wherein determining the S-shaped avoidance trajectory of the vehicle comprises determining a trajectory parameter,
wherein the trajectory parameter is determined based on a distance from the vehicle to the at least one object and on a lateral displacement of the vehicle with respect to the at least one object that is required for avoidance of the at least one object by the vehicle, and
wherein the distance from the vehicle to the at least one object accounts for a movement of the at least one object.

2. The method as claimed in claim 1, wherein the lateral displacement of the vehicle with respect to the at least one object that is required for the avoidance of the at least one object by the vehicle is determined from a width of the vehicle, a width of the at least one object, and a tolerance width.

3. A method for automatically activating a brake application in a vehicle having a brake system, the method comprising:
using at least one detection device, detecting at least one object in the environment of the vehicle; and
using at least one processor:
determining that a vehicle is on a collision course with the at least one object,
determining an S-shaped avoidance trajectory of the vehicle and at least one avoidance criterion based at least in part on the S-shaped avoidance trajectory,
determining two extreme values of a transverse acceleration of the vehicle from the S-shaped avoidance trajectory,
determining whether the at least one avoidance criteria is fulfilled by comparing the two extreme values with a threshold value, wherein the avoidance criteria is fulfilled when the two extreme values fall below the threshold value, and
activating an automatic brake application in the vehicle when an activation criterion for the automatic brake application is fulfilled, wherein the activation criterion for the automatic brake application is not fulfilled as long as the at least one avoidance criterion is fulfilled,
wherein determining the S-shaped avoidance trajectory of the vehicle comprises determining a trajectory parameter,
wherein the trajectory parameter is determined based on a distance from the vehicle to the at least one object and on a lateral displacement of the vehicle with respect to the at least one object that is required for avoidance of the at least one object by the vehicle, and wherein the lateral displacement of the vehicle with respect to the at least one object accounts for a movement of the at least one object.

4. A method for automatically activating a brake application in a vehicle having a brake system, the method comprising:
using at least one detection device, detecting at least one object in the environment of the vehicle; and
using at least one processor:
determining that a vehicle is on a collision course with the at least one object,
determining an S-shaped avoidance trajectory of the vehicle and at least one avoidance criterion based at least in part on the S-shaped avoidance trajectory,
determining two extreme values of a transverse acceleration of the vehicle from the S-shaped avoidance trajectory,
determining whether the at least one avoidance criteria is fulfilled by comparing the two extreme values with a threshold value, wherein the avoidance criteria is fulfilled when the two extreme values fall below the threshold value, and
activating an automatic brake application in the vehicle when an activation criterion for the automatic brake application is fulfilled, wherein the activation criterion for the automatic brake application is not fulfilled as long as the at least one avoidance criterion is fulfilled,
wherein determining the S-shaped avoidance trajectory of the vehicle accounts for a movement of the at least one object while the vehicle travels along the S-shaped avoidance trajectory.

5. The method as claimed in claim 1, wherein the S-shaped avoidance trajectory includes a turning point, a curve with a first radius of maximum curvature on a first side of the turning point, and a curve with a second radius of maximum curvature on a second side of the turning point.

6. The method as claimed in claim 5, wherein determining two extreme values of the transverse acceleration of the vehicle from the S-shaped avoidance trajectory comprises determining a first extreme value at a position of the curve having the first radius of maximum curvature and a second extreme value at a second position of the curve having the second radius of maximum curvature.

7. A method for automatically activating a brake application in a vehicle having a brake system, the method comprising:
using at least one detection device, detecting at least one object in the environment of the vehicle; and
using at least one processor:
determining that a vehicle is on a collision course with the at least one object,
determining an S-shaped avoidance trajectory of the vehicle and at least one avoidance criterion based at least in part on the S-shaped avoidance trajectory,
determining two extreme values of a transverse acceleration of the vehicle from the S-shaped avoidance trajectory,
determining whether the at least one avoidance criteria is fulfilled by comparing the two extreme values with a threshold value, wherein the avoidance criteria is fulfilled when the two extreme values fall below the threshold value, and
activating an automatic brake application in the vehicle when an activation criterion for the automatic brake application is fulfilled, wherein the activation criterion for the automatic brake application is not fulfilled as long as the at least one avoidance criterion is fulfilled,
wherein the S-shaped avoidance trajectory includes a turning point, a curve with a first radius of maximum curvature on a first side of the turning point, and a curve with a second radius of maximum curvature on a second side of the turning point,
wherein determining two extreme values of the transverse acceleration of the vehicle from the S-shaped avoidance trajectory comprises determining a longitudinal acceleration of the vehicle along the S-shaped avoidance trajectory and determining a first extreme value at a first position of the curve and determining a second extreme value at a second position of the curve,
wherein the first position of the curve is shifted, based on the longitudinal acceleration of the vehicle, relative to a position of the curve having the first radius of maximum curvature, and
wherein the second position of the curve is shifted, based on the longitudinal acceleration of the vehicle, relative to a position of the curve having the second radius of maximum curvature.

8. A method for automatically activating a brake application in a vehicle having a brake system, the method comprising:
using at least one detection device, detecting at least one object in the environment of the vehicle; and
using at least one processor:
determining that a vehicle is on a collision course with the at least one object,
determining an S-shaped avoidance trajectory of the vehicle and at least one avoidance criterion based at least in part on the S-shaped avoidance trajectory,
determining two extreme values of a transverse acceleration of the vehicle from the S-shaped avoidance trajectory,
determining whether the at least one avoidance criteria is fulfilled by comparing the two extreme values with a threshold value, wherein the avoidance criteria is fulfilled when the two extreme values fall below the threshold value, and
activating an automatic brake application in the vehicle when an activation criterion for the automatic brake application is fulfilled, wherein the activation criterion for the automatic brake application is not fulfilled as long as the at least one avoidance criterion is fulfilled,
wherein determining the S-shaped avoidance trajectory of the vehicle comprises determining a trajectory parameter,
wherein the trajectory parameter is determined based on a distance from the vehicle to the at least one object and on a lateral displacement of the vehicle with respect to the at least one object that is required for avoidance of the at least one object by the vehicle, and
wherein the S-shaped avoidance trajectory is determined using the equation $T(k)=a*k+b*\sin(c*k)$, wherein k represents the trajectory parameter, wherein $T(k)$ represents the avoidance trajectory, and wherein a, b, and c are scale parameters based on the distance from the vehicle to the at least one object and on the lateral displacement of the vehicle with respect to the at least one object that is required for avoidance of the at least one object by the vehicle.

9. The method as claimed in claim 8, wherein a curvature of the avoidance trajectory $T(k)$ is Kappa(k), wherein a velocity of the vehicle v(k) after a travel path s has been covered on the avoidance trajectory T(k) with a longitudinal acceleration a_long to reach point k is $v(k)=\sqrt{v_0^2+2*a\_long*s}$, wherein $v_0$ is the velocity of the vehicle prior to the avoidance maneuver, and wherein the transverse acceleration of the vehicle is a_quer(k)=v(k)$^2$*Kappa(k).

10. The method as claimed in claim 9, wherein the S-shaped avoidance trajectory includes a turning point, a curve with a first radius of maximum curvature on a first side of the turning point, and a curve with a second radius of maximum curvature on a second side of the turning point, and wherein a curvature of the curve at a position k1 of the curve having the first radius of maximum curvature is kappa_1, wherein a curvature of the curve at a position k2 of the curve having the second radius of maximum curvature is kappa_2.

11. The method as claimed in claim 10, wherein the two extreme values of the transverse acceleration of the vehicle are a_max_1=((v_0)$^2$+2*a_long*s_k$_1$)*kappa_1 and a_max_2=((v$_0$)$^2$+2*a_long*s_k$_2$)*kappa_2, wherein s_k$_1$ is the travel path covered on the avoidance trajectory T(k) to reach the position k1 and wherein s_k$_2$ is the travel path covered on the avoidance trajectory T(k) to reach the position k2.

12. An emergency brake system for a vehicle, the system comprising;
   a camera system;
   a proximity sensor;
   a sensor system;
   a primary brake system; and
   an ECU configured to effect the method according to claim 1.

13. The method as claimed in claim 3, wherein the lateral displacement of the vehicle with respect to the at least one object that is required for the avoidance of the at least one object by the vehicle is determined from a width of the vehicle, a width of the at least one object, and a tolerance width.

14. The method as claimed in claim 3, wherein the S-shaped avoidance trajectory includes a turning point, a curve with a first radius of maximum curvature on a first side of the turning point, and a curve with a second radius of maximum curvature on a second side of the turning point.

15. The method as claimed in claim 14, wherein determining two extreme values of the transverse acceleration of the vehicle from the S-shaped avoidance trajectory comprises determining a first extreme value at a position of the curve having the first radius of maximum curvature and a second extreme value at a second position of the curve having the second radius of maximum curvature.

16. The method as claimed in claim 4, wherein determining the S-shaped avoidance trajectory of the vehicle comprises determining a trajectory parameter,
   wherein the trajectory parameter is determined based on a distance from the vehicle to the at least one object, and
   wherein the distance from the vehicle to the at least one object accounts for a movement of the at least one object.

17. The method as claimed in claim 4, wherein determining the S-shaped avoidance trajectory of the vehicle comprises determining a trajectory parameter,
   wherein the trajectory parameter is determined based on a lateral displacement of the vehicle with respect to the at least one object that is required for avoidance of the at least one object by the vehicle, and
   wherein the lateral displacement of the vehicle with respect to the at least one object accounts for a movement of the at least one object.

18. The method as claimed in claim 1, wherein the lateral displacement of the vehicle with respect to the at least one object accounts for a movement of the at least one object.

19. The method as claimed in claim 3, wherein the distance from the vehicle to the at least one object accounts for a movement of the at least one object.

* * * * *